BENJAMIN B. CHADWICK.
Improvement in Plant-Growers.
No. 115,162. Patented May 23, 1871.
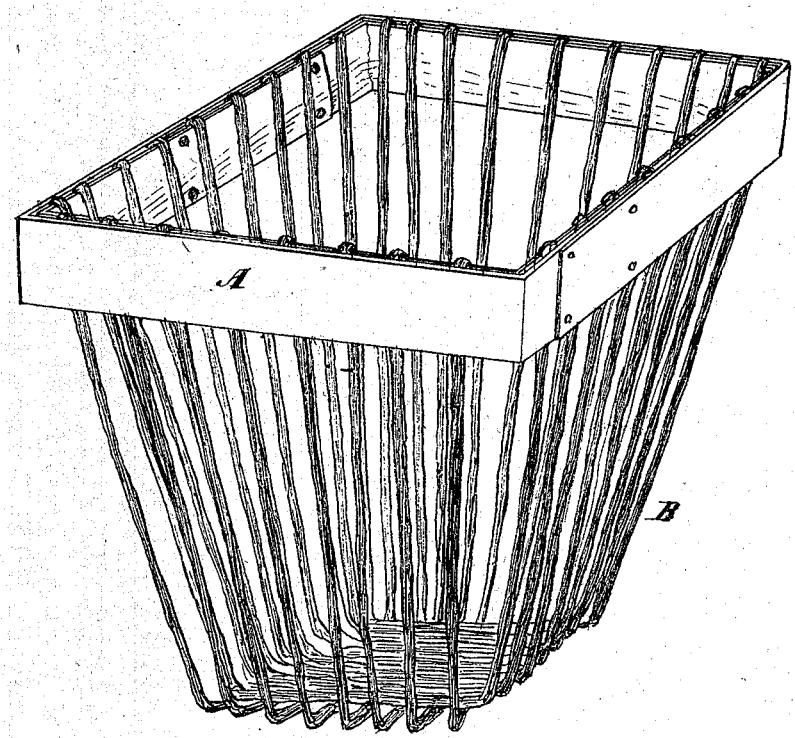
INVENTOR:
B. B. Chadwick
WITNESSES:
Marsden Davey
B. H. Smuhle

UNITED STATES PATENT OFFICE.

BENJAMIN B. CHADWICK, OF BUFFALO, NEW YORK.

IMPROVEMENT IN PLANT-GROWERS.

Specification forming part of Letters Patent No. 115,162, dated May 23, 1871; antedated May 12, 1871.

I, BENJAMIN B. CHADWICK, of the city of Buffalo, in the county of Erie and State of New York, have invented a certain new and Improved Plant-Grower, of which the following is a specification:

The nature of my invention consists in a new article of manufacture, namely, a basket or receptacle made of straw or such other materials which will be sufficiently strong for holding together a quantity of earth and a young plant growing therein, yet, when transplanted and placed into the ground, will quickly decay or decompose, and allow the plant to grow without impediment to the progress of the roots thereof.

In the accompanying drawing I have represented my invention in perspective.

It is well known that farmers and gardeners who wish to raise early vegetables, fruit, or flowers, plant their seeds in boxes, earthen pots, or other receptacles, some time during the winter, and keep them in the house or in green-houses constructed for this purpose, so as to permit the young plant to grow in shelter; and when in the spring the frost has left the earth, and the weather and temperature are favorable, those plants, then advanced in growth, are transferred or transplanted from said boxes or pots into the ground prepared for them, and come to their full growth in that way earlier than if they had been originally planted into the ground at the time and season the latter was in proper condition to receive plants and seeds. It is also well known that this transplanting is difficult, and has to be done with great care, inasmuch as it is necessary to keep the roots and the entire plant intact and in a healthy condition. Farmers and gardeners lose from one-quarter to one-half of plants set out in the spring in this manner. My invention provides a means by which the transplanting of young vegetables, fruit, or flowers may be facilitated, and the growth of all plants so set out aided and improved. For this purpose I construct a basket or receptacle as follows:

I take a strip of pasteboard, tin, or other suitable material, and form a rim, A, which may be round or square, as may be desired. This rim holds together the ends of pieces of straw, hay, grass, or other similar substances, which pieces are bent and interwoven in a manner to form a basket, as shown at B.

A number of these baskets may be placed within a box filled with earth, and the seeds or young plants arranged one in each basket. In this manner the box may be kept in the house or green-house during the cold weather and until the plants should be transferred to the ground. Then each basket containing a plant may be lifted out of the box separately and planted into the ground without disturbing the roots or removing the earth contained in the basket and immediately surrounding the plant.

Soon after the basket has been deposited into the ground the straw or other material of which I construct the basket will begin to decay or decompose, and allow the roots of the plant to spread and grow without obstruction. The body of the basket will, in time, be turned into excellent manure, which furnishes the roots of the plant rich nourishment and insures its healthy growth. These baskets can be made so cheap that farmers and gardeners can afford to use them for every one of their early plants.

The substance of which the body of the basket is made should be such as will decay when put into the ground, at least as fast as the growth of the roots of the plant require it.

I do not claim, broadly, the construction of baskets or other receptacles of straw, hay, or grass; nor do I claim the raising and transplanting of young plants in separate receptacles; but

What I claim as my invention is—

As an article of manufacture, the basket A B, when constructed of the materials and in the manner substantially as herein described, and for the purpose set forth.

B. B. CHADWICK.

Witnesses:
MARSDEN DAVEY,
B. H. MUEHLE.